Patented Sept. 16, 1952

2,610,961

UNITED STATES PATENT OFFICE 2,610,961

STABILIZATION OF THIXOTROPIC COMPOSITIONS COMPRISING POLYESTERS WITH QUINONE

Robert E. Burnett, Schenectady, N. Y., assignor to General Electric Company, a corporation of New York No Drawing. Application December 31, 1949, Serial No. 136,414

6 Claims. (Cl. 260—45.4)

This invention relates to polymerizable thixotropic coating and filling compositions comprising a polymerizable liquid and a filler. More particularly it relates to the stabilization of such materials which contain as a polymerization deterrent, t-butyl catechol.

In copending applications Serial Nos. 136,411–413, and 136,415–418, filed concurrently herewith and assigned to the same assignee as the present application, there are described various thixotropic solventless varnish-filler systems containing as a component thereof diethylene glycol maleate resin. While maleates such as diethylene glycol maleate, when freshly made, are very satisfactory for use in making the thixotropic compositions of the above-cited copending applications, they have a serious disadvantage when they become aged. This disadvantage is a tendency toward polymerization even at room temperature in the presence of air. This polymerization usually proceeds with the formation of an infusible skin over the surface of the resin. This skin is difficult to separate from the unpolymerized part of the fluid and often becomes broken up and mixes with and contaminates the latter. In order to preserve the maleate in the unpolymerized state over long periods of time, a polymerization deterrent or anti-skinning agent such as t-butyl catechol is often added usually in the amount of about 0.01 to 0.02 percent by weight. Whereas the unstabilized maleate resin will start to polymerize within a matter of several days if temperature and other conditions are adverse, one stabilized with the above amount of t-butyl catechol has an unpolymerized shelf life of a year or more.

While t-butyl catechol is effective in stabilizing the maleate resin, and is widely used for this purpose, when the latter so stabilized is used with other alkyd resins or esters of methacrylic acid and certain fillers as described in the above-cited copending applications to form thixotropic compositions, the latter often have a short shelf life. This short shelf life after which the thixotropic properties are lost is a serious obstacle to the practical use of such materials. It appears that the relatively early loss of thixotropy in systems containing a maleate resin with t-butyl catechol as an anti-skinning agent is attributable to a chemical reaction between the t-butyl catechol and certain peroxides which are used as catalysts to initiate the polymerization of the thixotropic compositions.

It is an object of this invention to provide a stabilizer for thixotropic compositions comprising a t-butyl catechol comprising an unsaturated alkyd resin, a polymerization initiator and a filler.

It is a further object of this invention to provide a stabilizer for thixotropic compositions comprising a t-butyl catechol containing alkyd resin, a polymerization catalyst and a filler which gives a suitable storage life to the compositions by preventing loss in thixotropic characteristics.

Other objects will become apparent from a consideration of the following description.

It has been found that the storage life of t-butyl catechol and polymerization initiator containing thixotropic compositions as described herein may be substantially improved by the addition of a small amount of quinone.

The polymerized liquids with which the present invention is concerned comprise mixtures of an unsaturated alkyd resin and a polyallyl ester of an alpha unsaturated alpha, beta polycarboxylic acid. These unsaturated alkyd resins are the reaction products of polyhydric alcohols, mixtures of polyhydric alcohols or mixtures of polyhydric alcohols and monohydric alcohols, and an unsaturated polycarboxylic acid or a plurality of polycarboxylic acids, one of which at least is an unsaturated polycarboxylic acid. Examples of such polyhydric alcohols are ethylene glycol, di- and triethylene glycols, propylene glycol, trimethylene glycol, tetramethylene glycol, pentamethylene glycol, glycerin, pentaerythritol, etc., either alone or in combination with various monohydric alcohols. Examples of unsaturated polycarboxylic acids are maleic, fumaric, itaconic, etc., acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixtures in the preparation of the unsaturated alkyd resins referred to above. Examples of such saturated polycarboxylic acids are succinic, adipic, sebacic, phthalic, etc., acids.

In addition to the above-described unsaturated alkyd resins, the polymerizable fluids also contain polymerizable substances comprising polyallyl esters of polycarboxylic acids, for instance, halogenated aromatic polycarboxylic acids, nonhalogenated aromatic polycarboxylic acids, saturated aliphatic dicarboxylic acids, etc. More specific examples of such polyallyl esters are, for instance, diallyl phthalate, diallyl succinate, diallyl maleate, diallyl fumarate, diallyl itaconate, diallyl chlorophthalate, triallyl phosphate, etc. Other substances which may be incorporated in these polymerizable liquids are esters of monohydric alcohols and unsaturated polycarboxylic acids which are capable of polymerizing with unsaturated alkyd resins such as, for example, dioctyl itaconate, dibenzyl itaconate, diethyl fumarate, dibenzyl fumarate, etc.

The following examples are given as typical of the action of t-butyl catechol containing thixotropic compositions when certain polymerization initiators or catalysts are added to facilitate the polymerization of the composition. As pointed out above, the t-butyl catechol is often used as a polymerization deterrent and anti-skinning agent to maintain the storage life of raw materials such as maleate resins. However, the teachings of this invention pertain as well to any resin which contains t-butyl catechol and is later polymerized using a polymerization catalyst as set forth herein. In these examples the thixotropic composition was composed as follows, all parts being by weight:

COMPOSITION A

|   | Parts |
|---|---|
| Diethylene glycol maleate (including 0.02% t-butyl catechol) | 50.0 |
| Diallyl phthalate | 50.0 |
| Catalpo clay | 60.0 |

The above materials when thoroughly mixed together gave a highly thixotropic composition. Varying additional amounts of t-butyl catechol were added as shown below to determine the effect of such additional amounts on the thixotropic state of the composition. Tertiary butyl perbenzoate was also added as a polymerization catalyst in the amounts shown.

Table I

| Example | Composite Parts by Weight | Additional t-butyl catechol (Parts by Weight) | t-butyl perbenzoate (Parts by Weight) |
|---|---|---|---|
| 1 | 160 | | |
| 2 | 160 | | 1.0 |
| 3 | 160 | 0.025 | 1.0 |
| 4 | 160 | 0.05 | 1.0 |
| 5 | 160 | 0.15 | 1.0 |
| 6 | 160 | 0.90 | 1.0 |
| 7 | 160 | 0.90 | |

Condition During Storage at 25° C.

| Example | Initial Condition | After 16 hrs. | After 40 hrs. | After 64 hrs. | After 136 hrs. | After 360 hrs. |
|---|---|---|---|---|---|---|
| 1 | T | T | T | T | T | T |
| 2 | T | T | T | VSR | VSR | SG |
| 3 | T | SR | SR | R | R | VR |
| 4 | T | SR | SR | R | R | VR |
| 5 | T | R | R | VR | VR | VR |
| 6 | T | R | R | VR | VR | VR |
| 7 | T | T | T | T | T | T |

T—Thixotropic
VSR—Very slightly runny
SR—Slightly runny
R—Runny
VR—Very runny
SG—Soft gel The thixotropic character of the above compositions was determined by stirring the materials after the times indicated with a glass rod and noting the tendency to cling to the rod when the latter was raised from the materials. From the above it will be noted that the compositions remain thixotropic for fifteen days when no polymerization catalyst such as t-butyl perbenzoate is used. As will be noted, increasing the amount of t-butyl catechol used in conjunction with the t-butyl perbenzoate only increased the tendency of the final composition to lose its thixotropy. The loss of thixotropy is also shown to be attributable to the simultaneous presence of both t-butyl catechol and the peroxide catalyst, t-butyl perbenzoate.

When 0.03 to 0.05 percent by weight of quinone is added to the final thixotropic mixture, the thixotropic conditions are maintained without change for fifteen days and longer. For example, a thixotropic composition was made up as follows, all parts being by weight:

Example 2

|   | Parts |
|---|---|
| Diethylene glycol maleate (including 0.01% t-butyl catechol) | 50.0 |
| Diallyl phthalate | 50.0 |
| Catalpo clay | 60.0 |
| Tertiary butyl perbenzoate | 1.0 |
| Quinone | 0.05 |

A highly thixotropic composition resulted when the above materials were thoroughly mixed together. Using the above method of stirring the composition with a glass rod and noting the drainage from the rod coated with the material, no change in thixotropy was noted after sixteen hours, forty hours, sixty-four hours, one hundred and thirty-six hours and three hundred and sixty hours.

Certain other polymerization catalysts or initiators besides t-butyl perbenzoate have been found to react with the t-butyl catechol to reduce the thixotropic aging properties of the present compositions. These include 2,2-bis(t-butyl peroxy)butane; 1,3-dimethyl cyclopentane hydroperoxide-1; di-t-butyl diperphthalate; t-amyl hydroperoxide and 2-phenyl 2-hydroperoxide propane. To illustrate the action of such catalysts in conjunction with t-butyl catechol containing thixotropic compositions the following materials were thoroughly mixed to form a highly thixotropic composition.

COMPOSITION B

|   | Parts |
|---|---|
| Diethylene glycol maleate (including 0.04% t-butyl catechol) | 50.0 |
| Diallyl phthalate | 50.0 |
| Catalpo clay | 82.0 |
| Peroxide (see Table II) | 1.0 |

All compositions were allowed to stand at 25°–30° C. In certain cases as noted, about 0.03 percent by weight of quinone was also added.

Table II

| Example | Type of Peroxide Added | Thixotropic Condition | | |
|---|---|---|---|---|
| | | At Start With and Without Quinone | After 20 Hrs. Without Quinone | After 20 Hrs. With Quinone |
| 8 | None | T | T | T |
| 9 | 2,2-bis (t-butyl peroxy) butane | T | R | T |
| 10 | t-butyl perbenzoate | T | R | T |
| 11 | 1,3 dimethyl cyclopentane hydroperoxide-1 | T | SR | T |
| 12 | di-t-butyl diperphthalate | T | SR | T |
| 13 | t-amyl hydroperoxide | T | SR | T |
| 14 | 2-phenyl 2-hydroperoxide propane | T | VSR | T |

T—Thixotropic
VSR—Very slightly runny
SR—Slightly runny
R—Runny

From a consideration of the above results, it is evident that the addition of quinone in small amounts lengthens the storage life of thixotropic compositions containing t-butyl catechol and the above polymerization catalysts.

While systems containing an ester of methacrylic acid in conjunction with a t-butyl catechol containing maleate are in general more stable than those in which all the resins are of the alkyd type, there is still a definite advantage in adding quinone to stabilize thixotropic compositions made therefrom.

By the teaching of this invention there is provided simple means for improving the thixotropic life of compositions comprising a t-butyl catechol anti-skinning agent and certain polymerization initiators. In all cases the quinone should be added to the catechol containing material before any peroxide initiator or catalyst. After such quinone addition, the composition may be stored ready for use over extended periods.

What I claim as new and desire to secure by Letters Patent of the United States is:

1. A thixotropic composition comprising a t-butyl catechol-containing unsaturated alkyd resin obtained by effecting reaction between a dihydric alcohol and an alpha unsaturated alpha beta polycarboxylic acid, together with a polyallyl ester of a dicarboxylic acid, a filler, quinone and a polymerization initiator selected from the class consisting of 2,2 bis (t-butyl peroxy) butane; t-butyl perbenzoate; 1,3-dimethyl cyclopentane hydroperoxide - 1; di - t - butyl diperphthalate; t-amyl hydroperoxide and 2-phenyl 2-hydroperoxide propane.

2. A thixotropic composition comprising a tertiary butyl catechol-containing unsaturated maleate alkyd resin obtained by effecting reaction between a dihydric alcohol and maleic anhydride, and also containing a polyallyl ester of a dicarboxylic acid, a filler, quinone and a polymerization initiator selected from the class consisting of 2,2 bis (t-butyl peroxy) butane; t-butyl perbenzoate; 1,3-dimethyl cyclopentane hydroperoxide-1; di-t-butyl diperphthalate; t-amyl hydroperoxide and 2-phenyl 2-hydroperoxide propane.

3. A thixotropic composition comprising diethylene glycol maleate and diallyl phthalate and containing as an anti-skinning agent t-butyl catechol, a filler, quinone and a polymerization initiator selected from the class consisting of 2,2 bis (t-butyl peroxy) butane; t-butyl perbenzoate; 1,3-dimethyl cyclopentane hydroperoxide-1; di-t-butyl diperphthalate; t-amyl hydroperoxide and 2-phenyl 2-hydroperoxide propane.

4. A thixotropic composition comprising diethylene glycol maleate containing as an anti-skinning agent t-butyl catechol, diallyl phthalate, a filler, quinone and a polymerization catalyst comprising t-butyl perbenzoate.

5. The process of stabilizing the thixotropic properties of compositions comprising a t-butyl catechol-containing unsaturated alkyd resin comprising the product of reaction of a dihydric alcohol and an alpha unsaturated alpha, beta dicarboxylic acid and also containing a polyallyl ester of a dicarboxylic acid, a filler and a polymerization catalyst selected from the class consisting of 2,2 bis (t-butyl peroxy) butane; t-butyl perbenzoate; 1,3-dimethyl cyclopentane hydroperoxide-1; di-t-butyl diperphthalate; t-amyl hydroperoxide and 2-phenyl 2-hydroperoxide propane which comprises adding from about three to five percent by weight of quinone before the addition of said polymerization catalyst.

6. A thixotropic composition comprising diethylene glycol maleate containing as an anti-skinning agent t-butyl catechol, diallyl phthalate, a filler, quinone and a polymerization catalyst comprising di-t-butyl diperphthalate.

ROBERT E. BURNETT.

REFERENCES CITED

The following references are of record in the file of this patent:

UNITED STATES PATENTS

| Number | Name | Date |
| --- | --- | --- |
| 2,443,741 | Kropa | June 22, 1948 |
| 2,457,657 | Glick | Dec. 28, 1948 |

OTHER REFERENCES

The Properties and Uses of Some Novel Organic Peroxides, Union Bay State Chemical Co., November 1947, page 10.